United States Patent [19]
Clarke

[11] 3,810,562
[45] May 14, 1974

[54] FLOWMETER
[76] Inventor: Robert E. Clarke, 1410 Saratoga Dr., Bel Air, Md. 21014
[22] Filed: Oct. 13, 1972
[21] Appl. No.: 297,492

[52] U.S. Cl. ............................................. 222/20
[51] Int. Cl. ........................................... B67d 5/30
[58] Field of Search ............................. 222/14–22

[56]     References Cited
         UNITED STATES PATENTS
3,497,106  2/1970   Clarke ................................. 222/20
2,024,320  12/1935  Walker ................................ 222/14
3,589,650  3/1952   Wolcott ............................... 222/20
2,955,725  10/1960  Niederst .............................. 222/17

*Primary Examiner*—Stanley H. Tollberg
*Assistant Examiner*—Thomas E. Kocovsky
*Attorney, Agent, or Firm*—J. Wesley Everett

[57]         ABSTRACT

A meter for measuring the amount of fluid flowing through a conduit from a source of supply to a delivery point. A rotary impeller driven by the flow of fluid through the meter, an indicator shaft driven through a reduction gearing by the impeller and a cut-off valve functioning to stop the flow of fluid after the pre-set amount of fluid or the amount of fluid represented by a pre-set price on the indicator has been reached, the valve being a reciprocating spring actuated valve operated by a cam disc on the indicator shaft and an automatically operated clutch means on the indicator shaft to render the cam disc inoperative and hold the valve open for free unmetered flow of the fluid through the device when desired.

1 Claim, 10 Drawing Figures

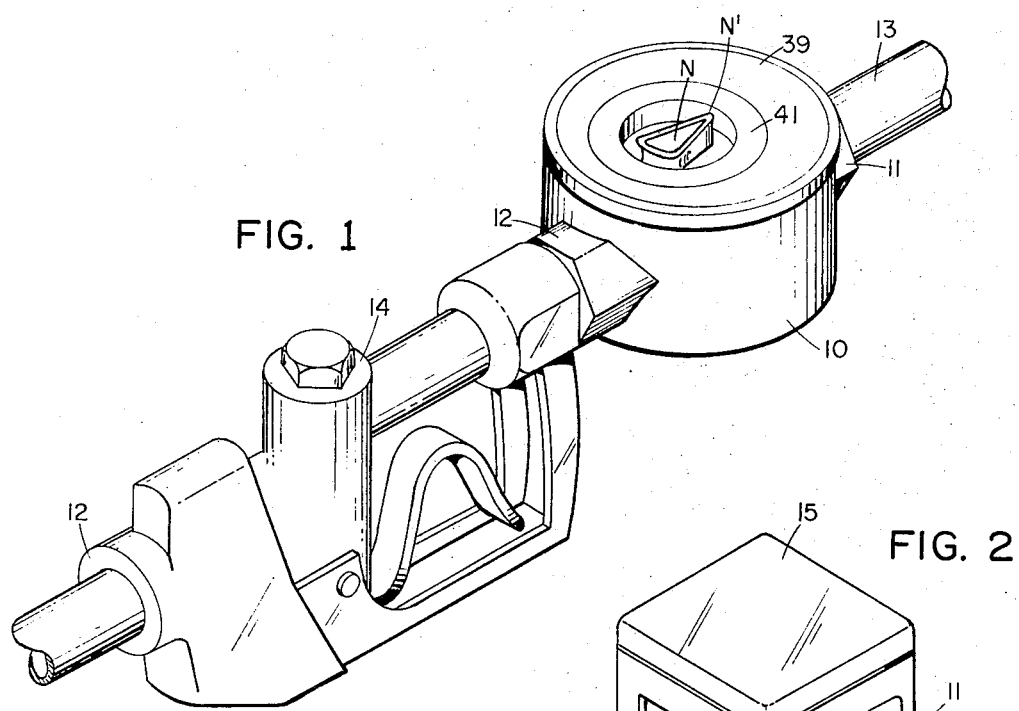
FIG. 1
FIG. 2
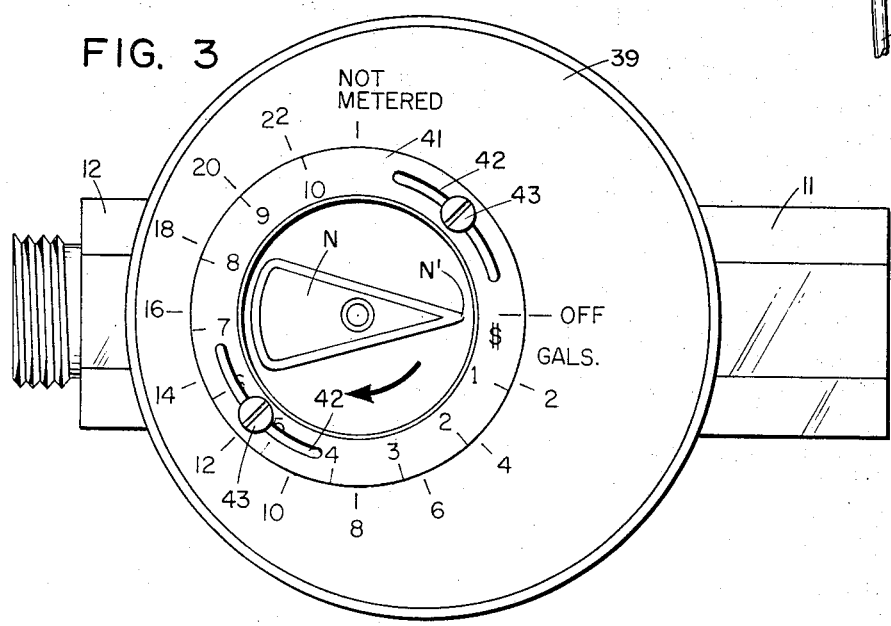
FIG. 3

FLOWMETER

This invention relates to fluid meters in general and more specifically to meters of the type for use in conjunction with gasoline pumps such as are commonly used in filling stations for delivery of gasoline to a customer's car.

It is one object of my invention to provide such a meter which not only will give accurate readings of amounts of gasoline delivered and/or the price of the amount delivered, but which may also be pre-set to deliver a pre-determined amount measured either in fluid measure of price and which will automatically shut off when the pre-determined amount is delivered, and to provide such a meter in which the automatic shut-off feature may be readily disengaged, if desired, to allow free unmetered flow of gasoline therethrough.

Still another object is to provide a meter of this character which is relatively economical to manufacture, trouble free in operation and rugged in character.

The above and other objects and advantages will become more apparent as this description proceeds, reference is had in this description to the accompanying drawings forming a part of this specification and in which like characters of reference refer to like parts throughout the several views. In said drawings FIG. 1 is a perspective view of a meter according to my invention installed in the delivery hose of a gasoline filling station pump directly behind the delivery valve;

FIG. 2 is a fragmentary perspective view of a filling station pump showing the meter installed on the fluid outlet pipe of the pump;

FIG. 3 is a top plan view of the meter;

Figure 9:
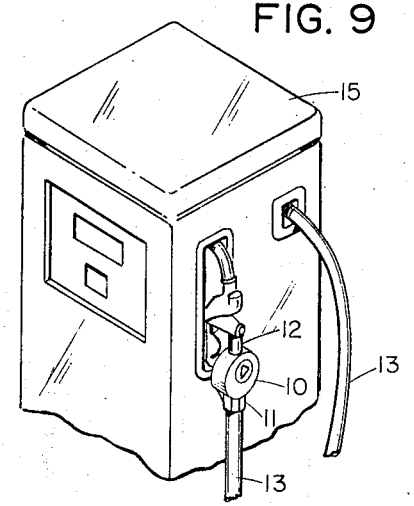
FIG. 9 is a fragmentary perspective view of a filling station pump showing the meter installed on the outer end of the fluid delivery hose between the hose and delivery valve.
Figure 7:
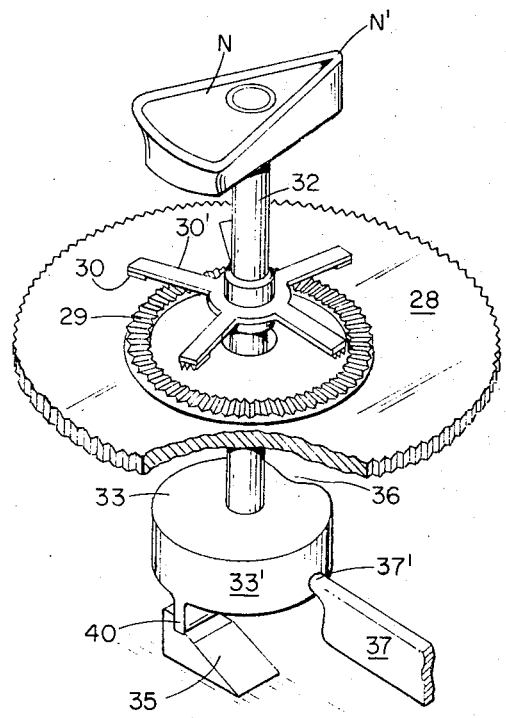
FIG. 7 is a view in perspective showing the automatic means for releasing the clutch element.

Referring to the drawings in detail and to the various parts of the meter as depicted therein, 10 represents a casing of any convenient shape having an inlet pipe 11 and an outlet pipe 12. The inlet pipe of the meter may be conveniently connected on the outlet pipe adjacent the pump 15 and have the delivery hose connected to the outlet side of the meter as shown in FIG. 2, or it may be installed at the outer end of the delivery hose 13 between the hose and the delivery valve 14 as shown in FIG. 9.

Within the inlet pipe 11 of the meter there is a reciprocating valve body 16 having a section formed with four longitudinal ribs 17 which slidably guide the valve body in a cylindrical bore 18 within the inlet pipe.

Figure 5:
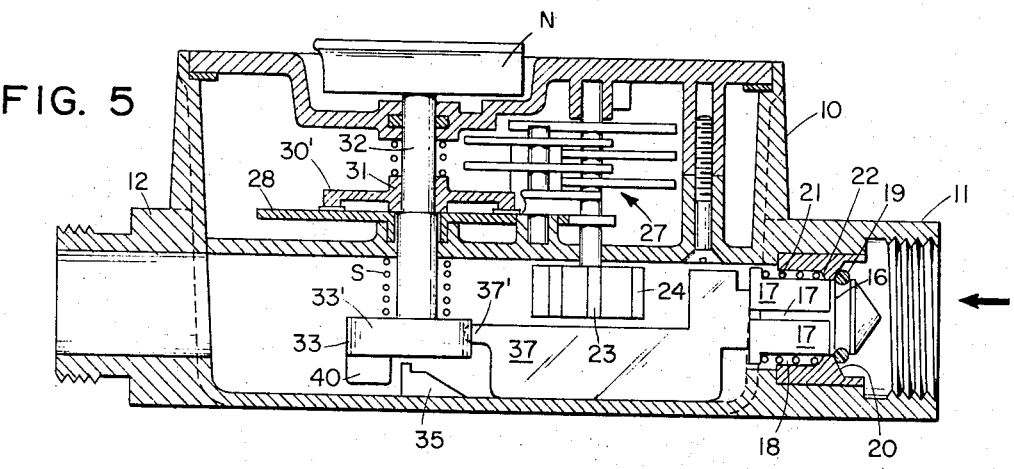
FIG. 5 is a sectional view taken on line 5—5 of FIG. 4 showing the flow control valve closed.
Figure 6:
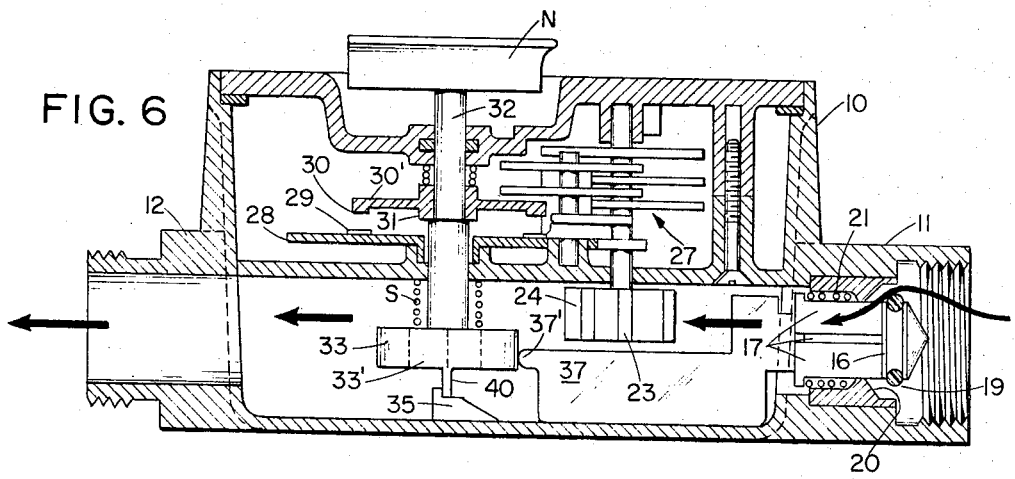
FIG. 6 is a sectional view taken on line 6—6 of FIG. 5 showing the flow valve in open position.

The valve body 16 carries a sealing ring 19 adjacent one end which cooperates with the seat 20 in the inlet pipe in one position to close off the liquid flow therethrough. A spring 21 acting on the valve body and a shoulder 22 in the inlet pipe urges the valve toward closed position as shown in FIGS. 5 and 6 for controlling the flow of fluid through the meter by mechanism hereinafter described.

Figure 4:
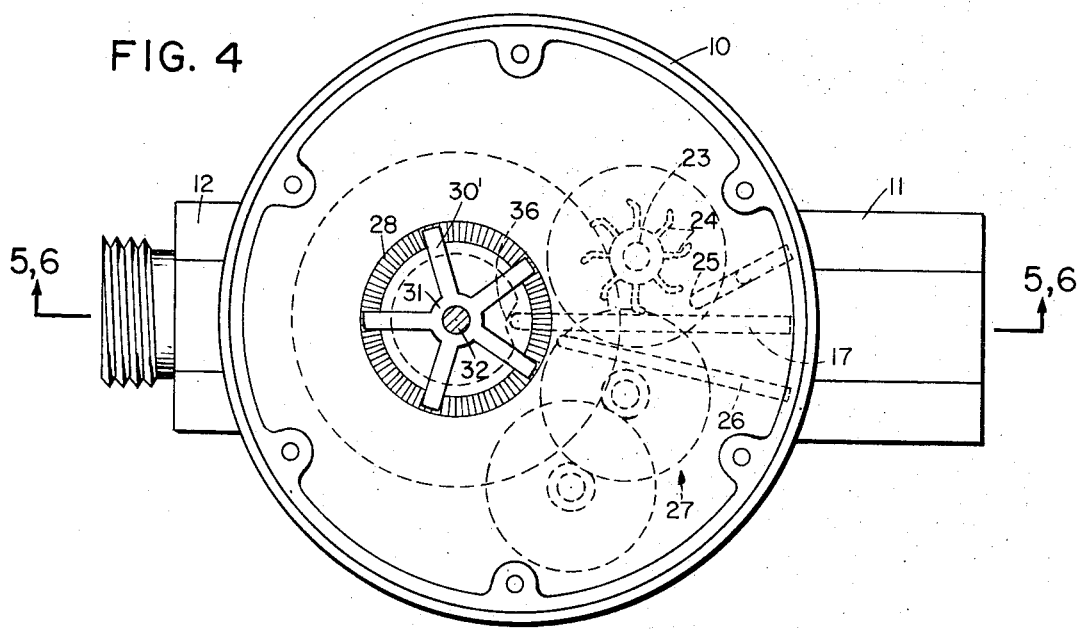
FIG. 4 is a view similar to FIG. 3 with the knob, top cover and certain internal parts removed.

An impeller wheel 23 is journalled within the casing and is driven or rotated by the fluid flow impinging against the vanes 24 thereof (see FIG. 4). The fluid is directed against the impeller vanes by means of angularly arranged housing walls 25 and 26 and rotates the impeller as it flows by.

The impeller transmits its rotary motion through a reduction gearing generally designated 27 to a master or final gear 28 journalled in the casing. The ratio of reduction in revolutions from the impeller wheel to the final or master gear is optional depending on how many units of fluid measure it is desired to be indicated on the indicator over the dial.

One face of the master or final gear is provided with radially extending V-shaped teeth 29 which cooperate with similar teeth 30 on the fingers 30' of a spider element 31 and when the teeth on the master gear and spider element are engaged these two elements will rotate as a unit.

The spider element fingers 30' are somewhat flexible and although the material of the spider element is not important it has been found that making this element of plastic such as nylon is very suitable.

The spider element 31 is carried by a shaft 32 journalled in the casing, which latter shaft extends outwardly through the top of the casing 10 on which is secured a knob N for manually setting the meter for the amount of fluid to be metered. The shaft 32 also carries a circular cam member 33. The cam member 33 is of uniform diameter except for a notch 36 in its outer surface and is concentrically mounted on the shaft 32.

Cooperating with the cam is a push rod 37 having one end 37' in sliding contact with the outer surface 33' of the cam 33. The push rod 37 is mounted for sliding movement in the casing and connected to the valve member 16. The spring 21 normally acts on the valve member 16 to urge the latter toward closing position. When the push rod 37 rides against the surface 33' of the cam the valve 16 is held open to allow the fluid to flow through the meter. The valve 16 is held open until the push rod drops into the notch 36, which allows the valve 16 to close.

The shaft 32 is adapted for limited longitudinal movement and is moved automatically by a fixed cam member 35 secured to the casing opposite the inner end of the shaft 32. Also fixed adjacent the inner end of the shaft 32 and extending outwardly from the under surface of the cam 33 is a finger or operating member 40 which engages the cam 35 and moves the shaft longitudinally automatically against the compression spring S. However, any suitable cam arrangement may be used. This action disengages the spider member 31 from the master gear 28, that is, the teeth 29 and 30 on the master gear and spider are out of contact and the master gear may be turned without driving the spider and the shaft 32. For this operation the meter is set by moving the pointer N' of the knob end to the point indicated by the number 1 and marked "No metering," as shown in FIG. 3. Therefore, with the spider 31 out of contact with the master gear 28 the shaft 32 will not be rotated by the rotation of the vanes 24 and when the knob N is set as described the fluid will continue to flow without interruption by the metering mechanism.

The top of the casing 10 is provided with a fixed graduated indicator dial 39 as shown in FIG. 3, marked off in units of liquid measure such as gallons and the knob N is provided with a pointer end N'. The pointer is located with respect to the notch 36 in cam 33 so that the pointer will indicate off when the push rod is in notch 36 and the valve is closed. Thus it may be seen that merely turning the delivery knob N to the number of units of measure to be delivered and the spider element 31 is in engagement with the master gear 28 the fluid will flow through the meter until the knob point reaches the off position, whereupon the push rod will be urged into the notch 36 by the spring 21 and the valve closed and the pre-set number of units of liquid will have flown through the meter.

In addition to the fixed dial 39 the meter may also be provided with an adjustable dial 41 graduated in price per unit of liquid measure. It may thus be seen that automatic delivery of a pre-set amount of liquid based on price per unit of measure may be delivered if desired. The adjustable dial 41 may be rotatably adjusted and clamped in various positions by means of the arcuate notches 42 and screws 43 to provide for a range of prices per unit of liquid measure.

Figure 8:
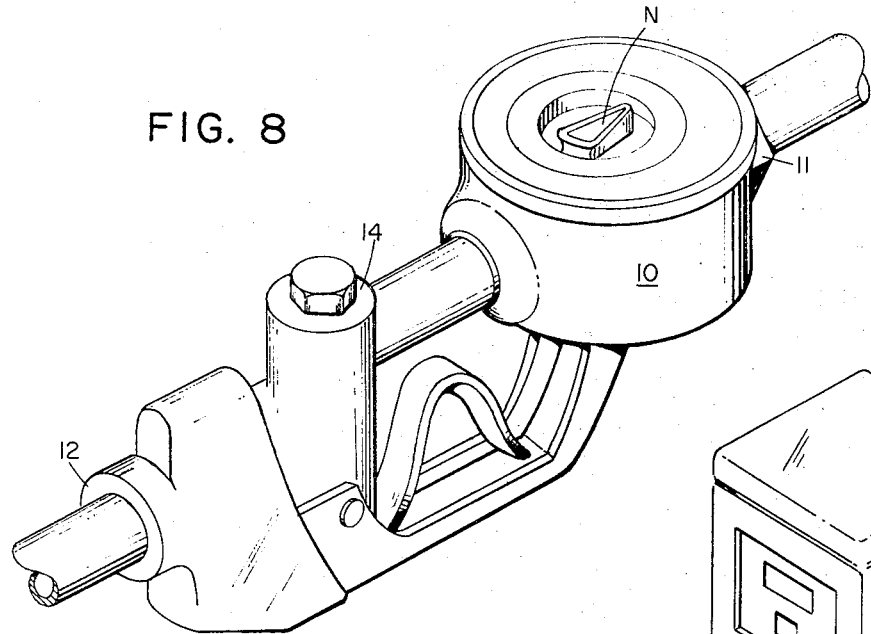
FIG. 8 is a perspective view of a modified form of meter.
Figure 10:
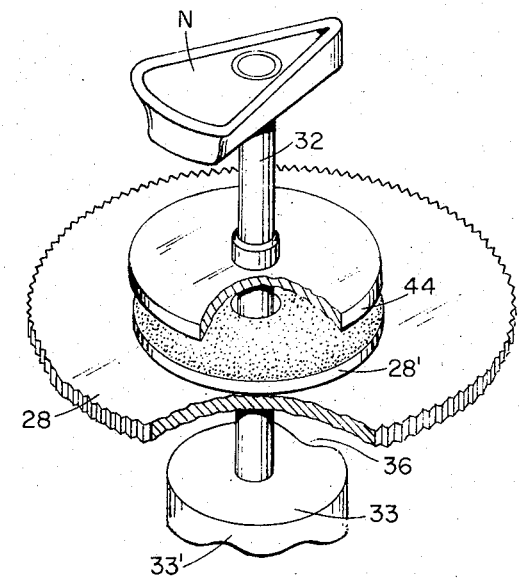
FIG. 10 is a fragmentary perspective view of a modified type of clutch.

FIG. 10 shows a modification in which a friction disc 44 replaces the spider member 31 in the combination previously described. In this form frictional contact between disc 44 and the face 28' of master gear 28 is sufficient to rotate the shaft 32 and its associated parts. While the modified form in FIG. 10 shows a friction drive for the shaft 32, the shaft may be driven by any of the well-known conventional clutch means, such as continuous intermeshing gears, a magnetic or fluid clutch, etc. It will also be noted in FIG. 8 the meter may be incorporated into the delivery valve 14.

Having described preferred forms of the device, it is to be understood that the invention is not intended to be limited thereto.

I claim:

1. A device for predetermining the quantity of fluid flowing through a pipe line comprising:
   a. a casing having fluid inlet and outlet openings for flow of fluid therethrough,
   b. a fluid motor within the casing driven by the flow of fluid,
   c. a rotary driven member journalled in the casing and coupled to the fluid motor and driven thereby,
   d. a shaft journalled in said casing in coaxial relationship and said rotary driven member and automatically axially shiftable in said casing,
   e. a clutch between said shaft and said rotary driven member, said clutch being automatically engageable and disengageable by axially shifting said shaft,
   f. said shaft extending through one side of the casing and a knob positioned on the outer end thereof for manually rotating the said shaft,
   g. a cam fixedly secured on the inner end of said shaft, said cam having a substantially broad circular outer face parallel to the axis of the shaft wherein the face is provided with a recess within a small area of said face having tapered side walls,
   h. a valve operating member having one end connected to said valve and its opposite end adapted to bear against the outer surface of the said cam face including means for resiliently holding the said end of the member in contact with the cam face for moving said valve to open position when the valve operating member is positioned against the outer circular face of the cam, and for closing the valve when the valve operating member moves into the said recess,
   i. a second cam member fixed to the casing opposite the inner end of the first cam, means extending downwardly from the inner surface of the first cam for engaging the second cam for raising the shaft for moving the clutch elements out of engagement when the shaft is manually rotated to a predetermined location to prevent further rotation of the shaft by said motor, the location of the second cam being such as to place the valve operating member on the outer circular surface of the first cam member when the shaft is rotated to the said predetermined position for holding the said valve in open position for the continuous flow of fluid through the device.

* * * * *

UNITED STATES PATENT OFFICE
CERTIFICATE OF CORRECTION

Patent No. 3,810,562       Dated May 14, 1974

Inventor(s) ROBERT E. CLARKE

It is certified that error appears in the above-identified patent and that said Letters Patent are hereby corrected as shown below:

Claim 1 (d), second line, cancel "and", first occurrence, and insert [ with ]

Signed and sealed this 1st day of October 1974.

(SEAL)
Attest:

McCOY M. GIBSON JR.
Attesting Officer

C. MARSHALL DANN
Commissioner of Patents